(12) United States Patent
Lin

(10) Patent No.: US 9,935,838 B2
(45) Date of Patent: Apr. 3, 2018

(54) MULTI-STAGE NETWORK DISCOVERY

(71) Applicant: ServiceNow, Inc., Santa Clara, CA (US)

(72) Inventor: Sky Chih Hsiang Lin, Arcadia, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 15/492,223

(22) Filed: Apr. 20, 2017

(65) Prior Publication Data

US 2017/0310547 A1 Oct. 26, 2017

Related U.S. Application Data

(60) Provisional application No. 62/325,244, filed on Apr. 20, 2016.

(51) Int. Cl.
*G06F 15/173* (2006.01)
*H04L 12/24* (2006.01)
*G06F 17/30* (2006.01)
*H04L 12/26* (2006.01)

(52) U.S. Cl.
CPC .... *H04L 41/0853* (2013.01); *G06F 17/30312* (2013.01); *G06F 17/30569* (2013.01); *H04L 41/0873* (2013.01); *H04L 41/12* (2013.01); *H04L 43/10* (2013.01); *H04L 41/0266* (2013.01); *H04L 41/0654* (2013.01)

(58) Field of Classification Search
USPC .................. 709/223, 224, 201, 202
See application file for complete search history.

(56) References Cited

U.S. PATENT DOCUMENTS

| 9,049,118 | B2 | 6/2015 | Narasimhan | |
|---|---|---|---|---|
| 2013/0182700 | A1* | 7/2013 | Figura | H04L 43/08 370/352 |
| 2014/0280268 | A1 | 9/2014 | McKay | |

(Continued)

OTHER PUBLICATIONS

Ahsan Arefin et al.; "CloudInsight: Shedding Light on the Cloud", 2011 30th IEEE Symposium on Reliable Distributed Systems (SRDS); Oct. 4, 2011; pp. 219-228.

(Continued)

*Primary Examiner* — Lan-Dai T Truong
(74) *Attorney, Agent, or Firm* — Fletcher Yoder PC

(57) ABSTRACT

In a multi-stage network discovery system, a target device is identified by a logical address and associated with a configuration item (CI) record stored in a configuration management database (CMDB). A receiver module receives first probe data from a first probe running against the target device, the first probe data comprising constant attribute data of the target device, stores at least part of the first probe data in a first part of the CI record, receives subsequent probe data from at least one subsequent probe against the target device using the logical address, the subsequent probe data comprising the constant attribute data of the target device, determines that the constant attribute data from the subsequent probe matches the constant attribute data from the CI record, and in response to the determination, stores the subsequent data obtained from the second probe in a second part of the CI record.

10 Claims, 7 Drawing Sheets

(56) References Cited

U.S. PATENT DOCUMENTS

| | | | |
|---|---|---|---|
| 2015/0186242 A1* | 7/2015 | Funk | G06F 11/3089 |
| | | | 702/186 |
| 2017/0034038 A1* | 2/2017 | Downey | H04L 43/50 |
| 2017/0177933 A1* | 6/2017 | Mittal | G06K 9/00476 |

OTHER PUBLICATIONS

Alexander Keller et al.; "Best practices for deploying a CMDB in large-scale environments", IFIP/IEEE International Symposium on Integrated Network Management, Jun. 1, 2009, pp. 732-745.
International Search Report and Written Opinion for PCT Application No. PCT/US2017/028632 dated Jul. 11, 2017, 15 pgs.

* cited by examiner

MULTI-STAGE NETWORK DISCOVERY

CROSS-REFERENCE TO RELATED APPLICATION(S)

This application claims priority to U.S. Provisional Patent Application No. 62/325,244, filed on Apr. 20, 2016, which is herein incorporated by reference in its entirety.

TECHNICAL FIELD

The present disclosure relates in general to techniques and devices for multi-stage network discovery.

BACKGROUND

Network discovery involves collecting data from numerous potential devices that exist on a network. Each device may require a large amount of data to fully describe the device, and discovery of certain information may be necessary before discovering further information. Information related to the network, devices within the network, and relationships between the devices may be stored in a configuration management database (CMDB), and records containing data for the devices, software, and relationships may be defined herein to be configuration items (CIs).

SUMMARY

Disclosed herein are implementations of systems and methods for mapping database record changes to application file sources executed in connection with a cloud-based platform module.

In an implementation, a multi-stage network discovery system is provided comprising a processor, a network interface capable of connecting to a target device, the target device identified by a logical address and associated with a configuration item (CI) record comprising data associated with the target device, a memory, a configuration management database (CMDB) that stores the CI record, a receiver module comprising instructions that are stored in the memory and are executable on the processor to, receive first probe data from a first probe running against the target device, the first probe data comprising constant attribute data of a constant attribute of the target device, store at least part of the first probe data in a first part of the CI record, receive subsequent probe data from at least one subsequent probe against the target device using the logical address, the subsequent probe data comprising the constant attribute data of the target device, determine that the constant attribute data from the subsequent probe matches the constant attribute data from the CI record, and in response to the determination, store the subsequent data obtained from the second probe in a second part of the CI record.

These and other implementations of the present disclosure are disclosed in the following detailed description, the appended claims, and the accompanying figures.

BRIEF DESCRIPTION OF THE DRAWINGS

The description herein makes reference to the accompanying drawings wherein like reference numerals refer to like parts throughout the several views.

DETAILED DESCRIPTION

A multi-stage network discovery system and process is designed to prevent an erroneous aggregation of data of multiple devices in a CI record that tracks information about a device when, for example, a logical address of a device changes between stages of a network probe. In an implementation, a logical address is something that is assignable to a device (e.g., an IP address) that can (and in some environments, may typically) change and may be utilized for network routing. A constant feature or attribute, such as the device's MAC address, can be obtained in probes subsequent to an initial probe in which the constant feature may have been obtained and matched against a value stored in a CI record. Alternately, the constant value from the initial probe might be used to create a new CI record. The system can be configured to detect when there is a difference between the constant feature returned from subsequent probes and the constant feature, which can indicate that the subsequent probe was sent to a different device from which previous information was collected. In such a case, error handling may be invoked to prevent the inclusion of data from two devices in a single record. Otherwise (i.e., no difference is detected), the additional information from the subsequent probes is stored since the device is presumably the same device. A constant feature, attribute, or identifier is defined herein as a feature, attribute, or identifier that is expected not to change, even if it might be technically possible to do so. For example, a MAC address may be considered a constant feature even though certain devices may be configured to use a different MAC address.

Figure 1:
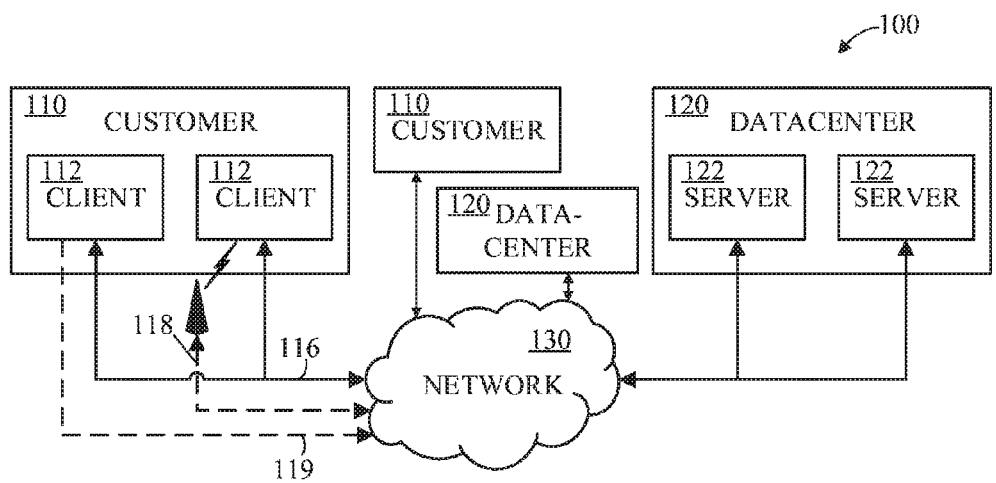
FIG. 1 is a block diagram of a distributed or cloud computing system.

To describe some implementations in greater detail, reference is first made to examples of hardware structures and interconnections usable in implementations of the present disclosure. FIG. 1 is a block diagram of a distributed or cloud computing system 100. Use of the phrase "cloud computing system" herein is a proxy for any form of a distributed computing system, and this phrase is used simply for ease of reference. Cloud computing system 100 can have any number of customers, including customer 110. Each customer 110 may have clients, such as clients 112. Each of clients 112 can be in the form of a computing system including multiple computing devices, or in the form of a single computing device, for example, a mobile phone, a tablet computer, a laptop computer, a notebook computer, a desktop computer, and the like. Customer 110 and clients 112 are examples only, and a cloud computing system may have a different number of customers or clients or may have a different configuration of customers or clients. For example, there may be hundreds or thousands of customers and each customer may have any number of clients.

Cloud computing system 100 can include any number of datacenters, including datacenter 120. Each datacenter 120 may have servers, such as servers 122. Each datacenter 120 may represent a facility in a different geographic location where servers 122 are located, a virtual datacenter 120 with virtual servers 122, and the like. Each of servers 122 can be in the form of a computing system including multiple computing devices, or in the form of a single computing device, for example, a desktop computer, a server computer, a virtual machine and the like. The datacenter 120 and servers 122 are examples only, and a cloud computing system may have a different number of datacenters 120 and servers 122 or may have a different configuration of datacenters 120 and servers 122. For example, there may be tens of datacenters 120 and each datacenter 120 may have hundreds or any number of servers 122.

Clients 112 and servers 122 may be configured to connect to network 130. The clients for a particular customer may connect to network 130 via a common connection point 116 or different connection points, e.g. a wireless connection point 118 and a wired connection point 119. Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of clients 112 and servers 122. Network 130, datacenter 120 and/or blocks not shown may include network hardware such as routers, switches, load balancers and/or other network devices.

Other implementations of the cloud computing system 100 are also possible. For example, devices other than the clients 112 and servers 122 shown may be included in system 100. In an implementation, one or more additional servers 122 may operate as a cloud infrastructure control, from which servers 122 and/or clients 112 of the cloud infrastructure are monitored, controlled and/or configured. For example, some or all of the techniques described herein may operate on the cloud infrastructure control servers. Alternatively, or in addition, some or all of the techniques described herein may operate on servers such as servers 122.

Figure 2:
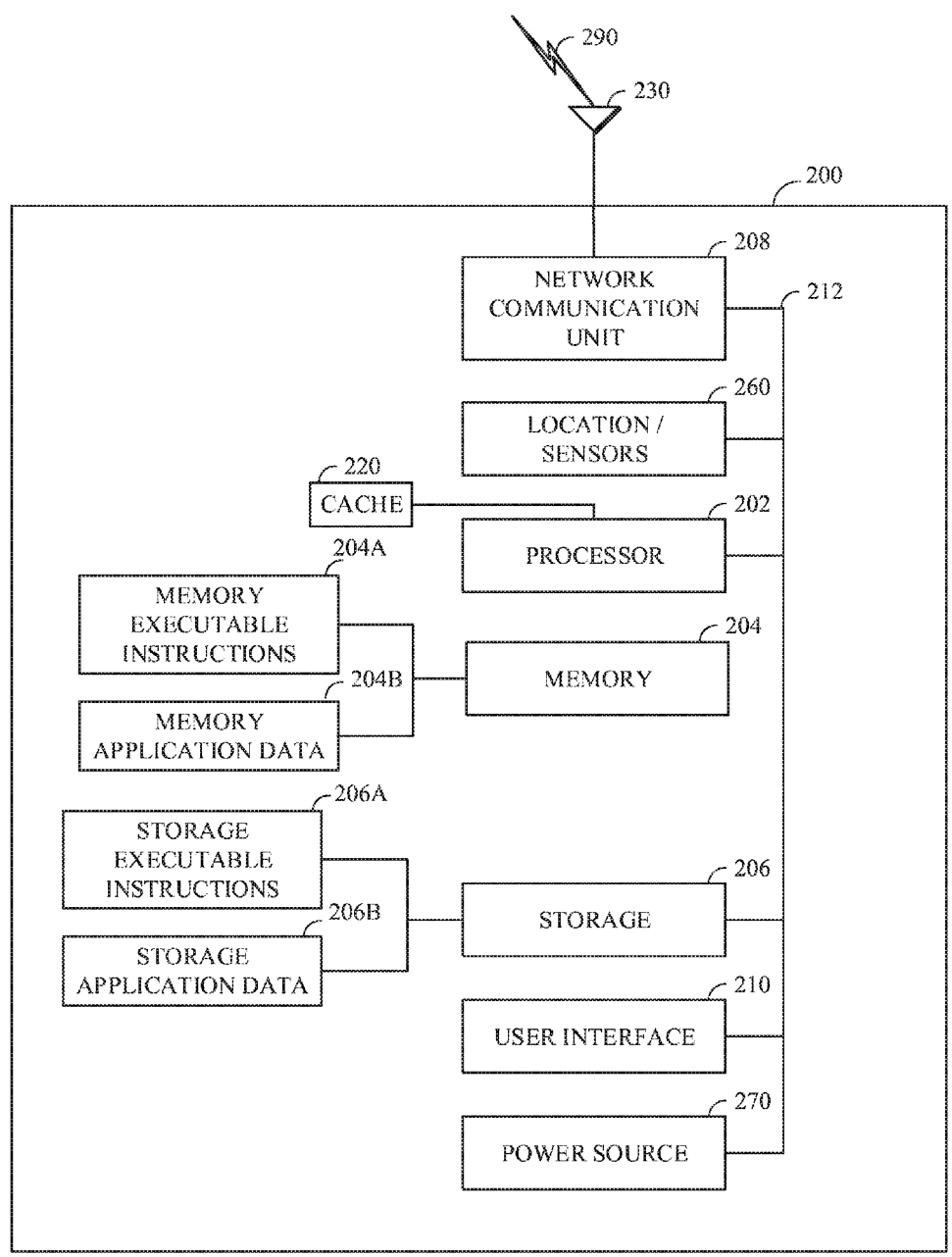
FIG. 2 is a block diagram of an implementation of an internal configuration of a computing device, such as a computing device of the computing system as shown in FIG. 1.

FIG. 2 is a block diagram of an implementation of an internal configuration of a computing device 200, such as a client 112 or server device 122 of the computing system 100 as shown in FIG. 1, including an infrastructure control server of a computing system. As previously described, clients 112 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 2. CPU (or processor) 202 can be a central processing unit, such as a microprocessor, and can include single or multiple processors, each having single or multiple processing cores. Alternatively, CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 202 can be distributed across multiple machines that can be coupled directly or across a local area or other network The CPU 202 can be a general purpose processor or a special purpose processor.

Random Access Memory (RAM) 204 can be any suitable non-permanent storage device that is used as memory. RAM 204 can include executable instructions and data for access by CPU 202. RAM 204 typically comprises one or more DRAM modules such as DDR SDRAM. Alternatively, RAM 204 can include another type of device, or multiple devices, capable of storing data for processing by CPU 202 now-existing or hereafter developed. CPU 202 can access and manipulate data in RAM 204 via bus 212. The CPU 202 may utilize a cache 220 as a form of localized fast memory for operating on data and instructions.

Storage 206 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 206 can include executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU 202. The executable instructions 206A may be organized into programmable modules or algorithms, functional programs, codes, and code segments designed to perform various functions described herein. The operating system can be, for example, a Microsoft Windows®, Mac OS X®, or Linux® operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 includes instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to CPU 202 via bus 212. The network communication unit 208 can utilize any of a variety of standardized network protocols, such as Ethernet, TCP/IP, or the like to effect communications between devices. The interface 230 can comprise one or more transceiver(s) that utilize the Ethernet, power line communication (PLC), WiFi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. Other output devices that permit a user to program or otherwise use the client or server can be provided in addition to or as an alternative to display 210. When the output device is or includes a display, the display can be implemented in various ways, including by a liquid crystal display (LCD) or a cathode-ray tube (CRT) or light emitting diode (LED) display, such as an OLED display.

Other implementations of the internal configuration or architecture of clients and servers 200 are also possible. For example, servers may omit display 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the device 200 itself or the environment around the device 200, or it may contain a location identification unit 260, such as a GPS or other type of location device. The computing device 200 may also contain a power source 270, such as a battery, so that the unit can operate in a self-contained manner. These may communicate with the CPU/processor 202 via the bus 212.

Figure 3A:
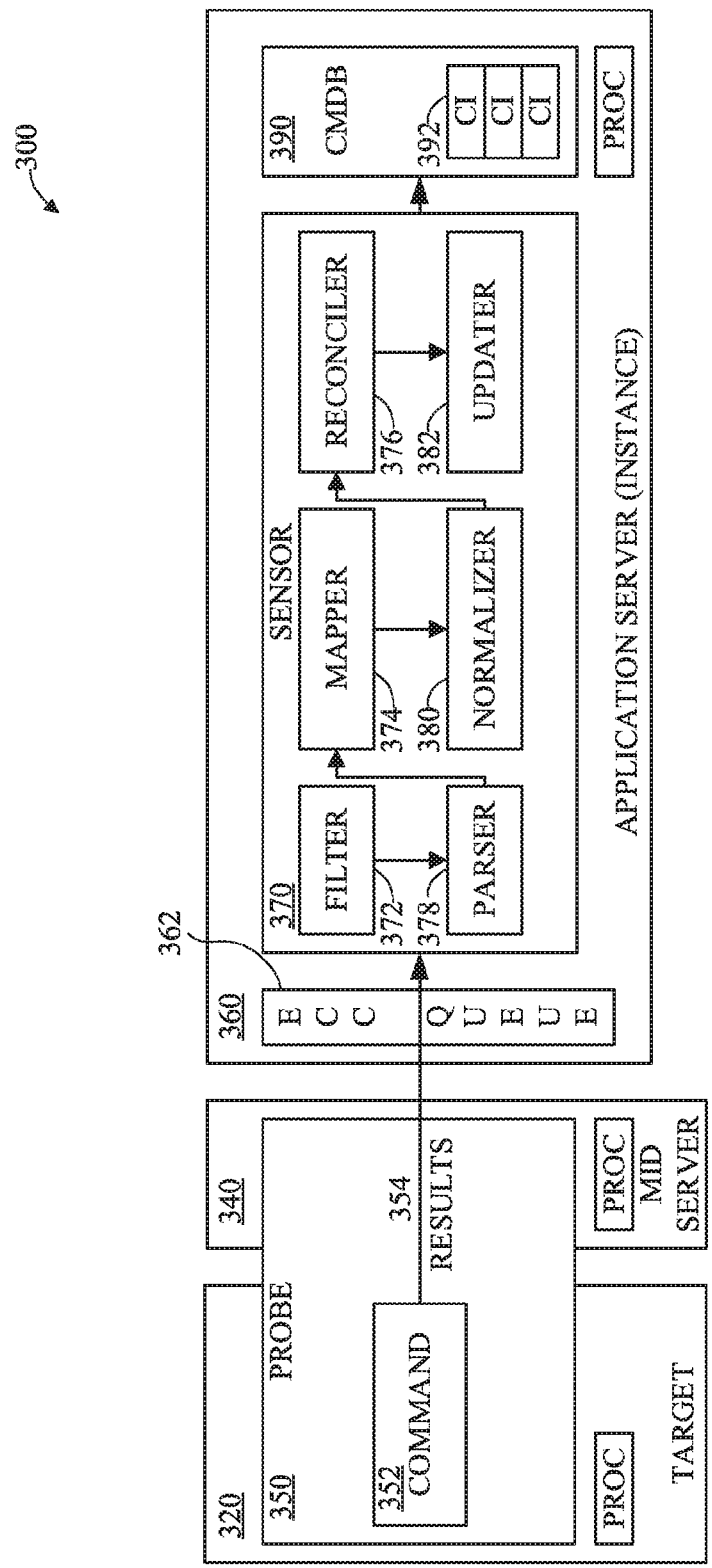
FIG. 3A is a block diagram showing components in an implementation of a discovery system.

Turning to the discovery process itself, FIG. 3A is a block diagram showing components in the discovery system 300 according to an implementation. The basic process of discovery may be performed by issuing a command 352 within a probe 350 against a discoverable target 320, e.g., device 200, and then receiving results 354 back from the target 320 by a sensor 370 in an instance of an application server 360. Since results 354 can come back from a wide variety of devices and in a wide variety of formats, various implementations can further normalize the received results or data 354. This data 354 for the device 320 may then be stored in a CI record 392 of the CMDB 390.

The following terminology is used in the following discussion. A "discovery fingerprint" is an algorithm that can be used to automate the discovery of a customer asset. "Horizontal discovery" is an implementation of discovery in which fingerprints are implemented as probes 350 and sensors 370. However, probes 350 and sensors 370 can be implemented using any other technique that can retrieve and process information from a device 320. An authoring tool may comprise basic platform forms and lists implemented in a computing platform or framework. A "probe" 350 is a command or set of commands that can be initiated by on the MID server 340 to collect raw data from assets (i.e., devices, software) within the customer network. The probe can execute on the management, instrumentation and discovery (MID) server 340, the target device 320, or a combination thereof. A "sensor" 370 can be one or more commands configured to process the probe's 350 output 354 and update the CMDB 390. The sensor 370 can be implemented on the MID server 340, the application server instance 360, or a combination thereof. "Vertical discovery" is an implementation of a contextual discovery that may be used, e.g., in the discovery of business services. Fingerprints may be implemented as patterns, and an authoring tool may be provided as a custom pattern or workflow editor. "System orchestration" is an implementation of change automation via a workflow process. An activity is a step in the workflow that may interact with the customer asset to push a desired change. The external communication channel (ECC) Queue 362 can be used to organize the communication between the MID server 340 and the application server instance 360. In an implementation, the MID server 340 is behind a firewall and the application server instance 360 may not be configured to push commands to the MID server 340. In such an implementation, communications between the application server instance 360 and the MID server 340 can be queued in the ECC Queue 362. The MID server 340 can be configured to contact the application server instance 360 on a periodic basis to retrieve commands and information from the ECC Queue 362 to be processed by the MID server 340.

The following processes/operation modules can be used to process the raw probe data and put it in the CMDB 390. The filter 372 can take the filtered raw data and remove extraneous data. The parser 378 can structure the filtered raw data and provide a key value(s) that may correspond to data in the CMDB 390. The mapper 374 can take the structured data and map it to corresponding structures in the CMDB 390. The normalizer 380 can take the mapped data and ensure that it has a common/standardized format. The reconciler 376 can address any issues with the data prior to it being stored in the CMDB 390. The updater 382 can take the reconciled data and add it into the CMDB 390. Any or all of these modules 372-382 can be present or omitted, and their functionality can be split across any of the entities 320, 340, 360.

One or more of the target device 320, MID server 340, and application server 360 may be a computing device 200 as described above.

In an implementation, extending the discovery fingerprints may involve writing probes 350 and sensors 370. There may be no explicit data contract between the probe 350 and sensor 370 pair for a CI 392 class. The author of a probe/sensor may look at an existing probe/sensor for similar CIs of the same class or analyzing CMDB schemas to understand the CI objects modeling involved. The author may also, for example, use a set of low-level primitive commands to execute against the target 320 and JavaScript to manipulate the raw data into a form consumable by the CMDB 390.

Several probes 350 may query similar data on different operating systems (OSs). The raw results 354 returned by these probes 350 may differ in format due to the differences of the OSs. A different sensor 370 can thus be utilized for each probe 350. Thus, the sensor's 370 JavaScript can be composed of duplicated code copied from sensors 370 with similar parsing patterns. At best, some patterns are extracted into loosely coupled script includes and prototypes. Given a preference for using application scoping, utilizing existing code for proper scoping may be challenging. To address this, a declarative programming approach may be utilized.

In order to take advantage of declarative programming, the sensor 370 may be broken down into smaller discrete units of functionalities and provide implementation for as many of these units as possible. For the vast majority, implementing a fingerprint can simply become declaring particular units to use and particular parameters are to be applied to each unit. In some cases where some functionality may be missing, an extension point can be provided for imperative programming via JavaScript. This may be significant when application scoping is taken into consideration since each unit may be isolated and thereby scoped based on the isolation versus a monolithic model of a sensor that performs various scoping operations and further relies on many other artifacts to perform such operations. Thus, in an implementation, it may be desirable to: 1) explicitly define a data contract between a probe 350 and a sensor 370 for each CI 392 class; 2) have a common sensor 370 for each CI 390 class; 3) provide a library of commonly used patterns to assist with the probe 350 authoring process; and/or 4) provide a mechanism to chain together these patterns to minimize the amount of code that must be written for writing probes 350 for many use cases.

It may be desirable for a data contract to be clearly defined for each CI class 392 that tells a probe 350 writer exactly what data 354 that needs to be gathered and what format to return the data 354. In a simple form, the contract can simply be documented in writing. In an implementation, the JSON schema can be used to specify the data contracts. JSON schema is very flexible and can accommodate complex modeling needs. An example of a fairly complex and accurate model for UNIX storage may be found at http://json-schema.org/example2.html. In a further implementation, the data contract may be automatically generated from DB schema with some additional metadata annotation. This is very easy to achieve for flat tables, but can also be achieved for more complex models such as storage where multiple nested relationships exist.

With a data contract defined for a CI class 392, a single sensor 370 can be used to process results from probes 350 for that CI class 392. This can be an improvement over implementations that include probes that return differing data formats and that have different sensors to process results from multiple probes. Since the data contract can be defined to resemble a CMDB CI structure, by default the sensor 370 attempts to generically match returned data objects to CMDB 390 fields automatically. The data contract can also specify which attributes are required for correct identification or reconciliation. If these required attributes are missing, the sensor 370 can reject the entire payload as invalid. As for missing optional attributes or extra attributes not specified in the data contract, it can be up to each sensor 370 to define the behavior. For simple cases where the data contract matches exactly to the CI fields, a multi-purpose sensor 370 can be used as is without having to write a single line of code. This sensor 370 could also accommodate cases where custom probes 350 return extra data to populate custom CI fields added by the customer. This can reduce situations in which complex scripting is required.

Figure 3B:
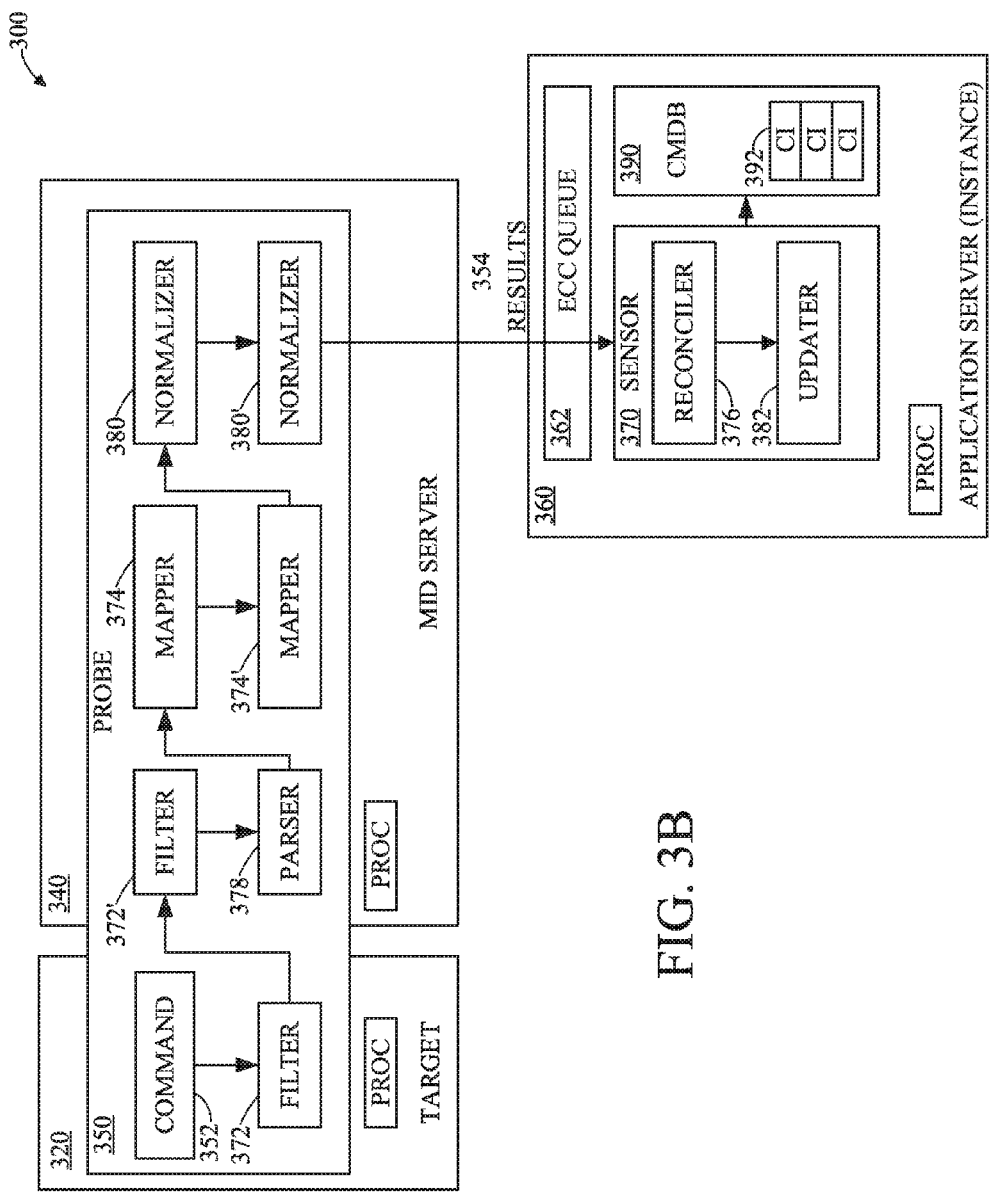
FIG. 3B is a block diagram showing components in another implementation of a discovery system.

In an implementation, the parsing and normalization can be the responsibility of the probe writer, and thus a set of commonly used patterns can be provided to make this process easier. In order to better extract these patterns, the probe process may be broken down into a pipeline of steps, as is illustrated in FIG. 3B, which is a block diagram showing components in this implementation of a discovery system 300. By using a common foundation, it is much easier to provide a common authoring UI.

These steps can be executed as the probe's 350 post processing on the MID server 340 or the sensor's 370 pre-processing on the instance 360. For higher scalability, the processing can be done on the MID server 340 but at the expense of requiring a more capable MID server 340—this choice can be provided as a configurable option.

Figure 4:
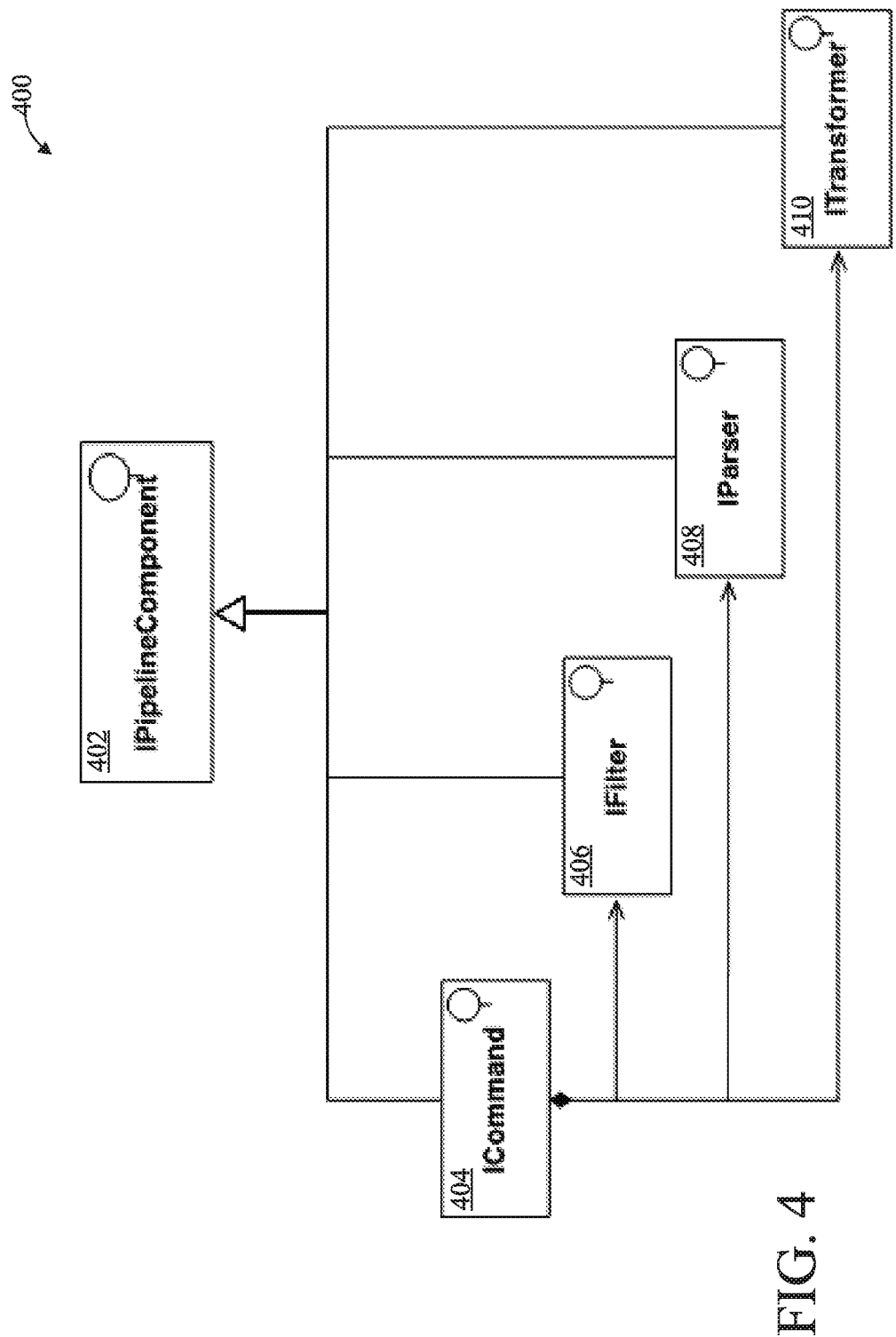
FIG. 4 is a unified modeling language (UML) class diagram that shows interface relationships and composition of a single command.

FIG. 4 is a unified modeling language (UML) class diagram 400 that shows an implementation of interface relationships and composition of a single command for a pipeline component 402. The command 404 (352) may be a command, set of commands, or script, that may be used to produce the raw data when executing on the remote target 320. At the lowest level, these may be primitive commands for various protocols, such as: UNIX command/script, Windows command/script, simple network management protocol (SNMP), storage management initiative specification (SMI-S), and virtualized computing application programing interfaces (VMware API). Where an ability to extract common patterns is present (e.g., from UNIX and Windows commands), these patterns may be offered as higher level commands. Some examples of these are: 1) file content: given a list of paths, return either the content of the first file that exists or the overlay of all files based on the content being structured such as key/value pairs; and 2) alternate commands: given a list of commands, return the result from the first successfully executed command.

Regarding the filter 406 (e.g., filter 372, 372'), sometimes, commands produce a large volume of raw data from which only a limited portion is useful to perform one or more discovery stages. This step provides the mechanism to quickly filter out extraneous data. For scalability reasons, when possible, the filter 372 may be applied on the remote target 320 since this would reduce both LAN traffic to the MID server 340 and the data the MID server 340 has to parse. Each command may have the option to accept a filter 372 for optimization. If accepted, the filter 372 will be bundled with the command 352 and executed on the remote host 320. If rejected, the filter 372' may be applied on the MID server 340. Some examples of commonly used filters are: key/value: matches certain keys or certain values; table columns: if data structure is a table, return certain columns; and regex: return matched lines. For complex cases with no discernable pattern, JavaScript can also be used as a filter. However, this type of filter can only be applied on the MID server 340, and not the remote target 320.

Regarding the parser 408 (e.g., parser 378), the filtered raw data string may be parsed and converted to structured JSON objects. Some examples of commonly used parsers are: key/value; table; XML; JSON; and regex. For complex cases with no discernible pattern, JavaScript can also be used as a parser.

Regarding the transformer 410, in this step, the input structured JSON may be transformed into a different JSON structure. Some transformers 410 are simple key mappers where certain JSON elements are renamed or where array elements are deconstructed into named elements. Some transformers 410 are simple value normalizers 380 to convert raw string values of certain elements to the appropriate normalized values. More complex transformers can be used to perform calculation or aggregation. Some examples of commonly used key mappers 374 are: dictionary and array deconstruction. Some examples of commonly used value normalizers 380 are: MAC address, IP address, Fibre Channel World Wide Name (WWN), and memory/storage size.

Some examples of commonly used complex transformers are: start time calculation (given current time and elapsed duration); array sum (summing certain row or column of an array); and Java interfaces.

The following example demonstrates how the output is transformed as it passes through the various stages in the pipeline.

SSH Command: ps alxww (on remote target)

| UID | PID | PPID | CPU | PRI | NI | VSZ | RSS | WCHAN | STAT | TT | TIME | COMMAND |
|---|---|---|---|---|---|---|---|---|---|---|---|---|
| 0 | 1 | 0 | 0 | 31 | 0 | 2511156 | 7088 | — | Ss | ?? | 4:43.15 | /sbin/launchd |
| 0 | 13 | 1 | 0 | 63 | 0 | 2539588 | 7128 | — | Ss | ?? | 0:07.93 | /usr/libexec/UserEventAgent (System) |
| 0 | 14 | 1 | 0 | 33 | 0 | 2540600 | 9548 | — | Ss | ?? | 0:05.51 | /usr/libexec/kextd |
| 0 | 15 | 1 | 0 | 33 | 0 | 2537416 | 3432 | — | Ss | ?? | 0:13.11 | /usr/libexec/taskgated −s |
| 0 | 16 | 1 | 0 | 33 | 0 | 2540048 | 4028 | — | Ss | ?? | 0:13.07 | /usr/sbin/securityd −i |
| 0 | 17 | 1 | 0 | 33 | 0 | 2525116 | 1360 | — | Ss | ?? | 4:17.13 | <defunct> |
| 0 | 18 | 1 | 0 | 33 | 0 | 2536920 | 2160 | — | Ss | ?? | 0:07.14 | /System/Library/CoreServices/powerd.bundle |

Filter: RegEx excluding "<defunct>" (on remote target with grep)

| UID | PID | PPID | CPU | PRI | NI | VSZ | RSS | WCHAN | STAT | TT | TIME | COMMAND |
|---|---|---|---|---|---|---|---|---|---|---|---|---|
| 0 | 1 | 0 | 0 | 31 | 0 | 2511156 | 7088 | — | Ss | ?? | 4:43.15 | /sbin/launchd |
| 0 | 13 | 1 | 0 | 63 | 0 | 2539588 | 7128 | — | Ss | ?? | 0:07.93 | /usr/libexec/UserEventAgent (System) |
| 0 | 14 | 1 | 0 | 33 | 0 | 2540600 | 9548 | — | Ss | ?? | 0:05.51 | /usr/libexec/kextd |

-continued

| UID | PID | PPID | CPU | PRI | NI | VSZ | RSS | WCHAN | STAT | TT | TIME | COMMAND |
|---|---|---|---|---|---|---|---|---|---|---|---|---|
| 0 | 15 | 1 | 0 | 33 | 0 | 2537416 | 3432 | — | Ss | ?? | 0:13.11 | /usr/libexec/taskgated −s |
| 0 | 16 | 1 | 0 | 33 | 0 | 2540048 | 4028 | — | Ss | ?? | 0:13.07 | /usr/sbin/securityd −i |
| 0 | 18 | 1 | 0 | 33 | 0 | 2536920 | 2160 | — | Ss | ?? | 0:07.14 | /System/Library/CoreServices/powerd.bundle |
| 0 | 20 | 1 | 0 | 33 | 0 | 2540136 | 5588 | — | Ss | ?? | 0:24.71 | /usr/libexec/configd |

Filter: Table include columns 1, 2, and 12 (on remote target with awk)

| PID | PPID | COMMAND |
|---|---|---|
| 1 | 0 | /sbin/launchd |
| 13 | 1 | /usr/libexec/UserEventAgent (System) |
| 14 | 1 | /usr/libexec/kextd |
| 15 | 1 | /usr/libexec/taskgated -s |
| 16 | 1 | /usr/sbin/securityd -i |
| 18 | 1 | /System/Library/CoreServices/powerd.bundle/powerd |
| 20 | 1 | /usr/libexec/configd |

Parser: Table with header row

```
[
 { PID: '1', PPID: '0', COMMAND: '/sbin/launchd' },
 { PID: '13', PPID: '1', COMMAND: '/usr/libexec/UserEventAgent
(System)' },
 { PID: '14', PPID: '1', COMMAND: '/usr/libexec/kextd' },
 { PID: '15', PPID: '1', COMMAND: '/usr/libexec/taskgated −s' },
 { PID: '16', PPID: '1', COMMAND: '/usr/sbin/securityd −i' },
 { PID: '18', PPID: '1', COMMAND: '/System/Library/CoreServices/
powerd.bundle' },
```

Key Mapper: Dictionary PID=pid, PPID=ppid, COMMAND=command

```
[
 { pid: '1', ppid: '0', command: '/sbin/launchd' },
 { pid: '13', ppid: '1', command: '/usr/libexec/UserEventAgent
(System)' },
 { pid: '14', ppid: '1', command: '/usr/libexec/kextd' },
 { pid: '15', ppid: '1', command: '/usr/libexec/taskgated −s' },
 { pid: '16', ppid: '1', command: '/usr/sbin/securityd −i' },
 { pid: '18', ppid: '1', command: '/System/Library/CoreServices/
powerd.bundle' },
```

A base table may be provided for automation pipeline commands having a name, short description, and type, where type may be a Java class name of the command implementation. A many-to-many relationship from the base table to the probe table can be provided. As each specific command is implemented, a corresponding table extending this table may be created to provide input parameters pertinent to that specific command.

A base table may be provided for command pipeline filters having a name, short description, and type, where type may be the Java class name of the filter implementation. There is an ordered many-to-many relationship from this table to the command table having a command (type reference to a pipeline command), component (type reference to a pipeline filter), and order, which may be an integer. As each specific filter is implemented, a corresponding table extending this table may be created to provide input parameters pertinent to that specific filter.

A base table may be provided for all command pipeline parsers having a name, short description, and type, where type may be the Java class name of the parser implementation. There may be an ordered many-to-many relationship from this table to the command table having command (type reference to a pipeline command), component (type reference to a pipeline parser), and order, which may be an integer. As each specific parser is implemented, a corresponding table extending this table may be created to provide input parameters pertinent to that specific parser.

A base table may be provided for all command pipeline transformers having a name, short description, and type, where type may be a Java class name of the transformer implementation. There is an ordered many-to-many relationship from this table to the command table having command (type reference to a pipeline command), component (type reference to a pipeline transformer), and order, which may be an integer. As each specific transformer is implemented, a corresponding table extending this table is created to provide input parameters pertinent to that specific transformer.

By offloading at least some of the processing from the instance 360 to the MID server 340, a net benefit for the instance 360 performance can be realized during periods of heavy activity. Likewise, by offloading at least some of the filtering to the target devices, a net benefit for the MID server performance may be realized.

In an implementation, the raw, unfiltered result 354 of each probe 350 can be posted as a SOAP message to be inserted into the ECC queue table 362 on the instance 360. This segment may consume the following resources on the instance 360: 1) incoming network bandwidth to transfer the payload from the MID server 340 to the instance 360; 2) CPU (e.g., 202) and memory to read in the payload and insert into the database CMDB 390; 3) database disk space 206 to store the payload in the ECC queue table 362 (ECC queue messages may be kept, e.g., for 7 days). Asynchronously at a later time, the payload is read back out from the ECC queue table 362 and processed by the sensor 370. This segment may consume the following resources on the instance 360: 1) CPU 202 and memory 204 to query the database 390 and load the payload back into memory 204; 2) CPU 202 and memory 204 to filter, parse, and normalize the raw result 354; 3) CPU 202 and memory 204 for remaining processing (reconciling and updating Cis 392, common to both current and proposed approaches).

With one proposed architecture, by moving the filtering, parsing, and normalizing responsibility from the instance 360 to the MID server 340, the CPU 202 and memory 204 consumed by these operations are eliminated from the instance 360. Furthermore, the filtered payload size may be reduced to about one-third to one-fifth of the unfiltered payload. This payload reduction may directly translate to savings on network bandwidth, CPU 202, memory 204, and database disk space to transfer and store the payload, although this architecture will require the MID server 340 to have additional CPU 202 and memory 204 to take on the additional workload.

The CMDB 390 contains many CI records 392 describing the devices and device relationships within the network, and, as described above, information may be gathered from the respective devices by the use of probes 350. In general, individual probes 350 may be relatively focused and only request a small portion of the information available from a device at a time for a number of reasons. Thus, a number of probes 350 are needed to get a complete description of the device for the CI record 392.

The network discovery process may therefore be broken down into a series of different probe types (i.e., probes for different sets of data) that may be spread over time for a device on the network described by the CI 392 in the CMDB 390. The reason for the breakdown is that return information 354 from a probe 350 might be needed for a subsequent probe 350, and, additionally, to keep the return information 354 relatively small. Also, this makes it easier to debug problems. For example, if a device is discovered to be a Microsoft Windows device, then certain procedures are invoked specifically for obtaining information from such a Windows device. These procedures may differ for, e.g., a Linux device.

It is possible that the device/target 320 may have changed between probes (e.g., faulty device was replaced). If that occurs, the system should know this fact and not presume it was the previous device when performing a probe that might not normally detect the change (e.g., a software probe). If a changed device is ignored, it is possible that some of the information in the CI 392 will relate to the old device, whereas other information for the same CI 392 will relate to the new device. This is illustrated in the following FIGS. 5A-5C.

Figure 5A:
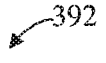
FIG. 5A is a block diagram of a CI record data structure in an initial stage.

Referring to FIG. 5A, which is a block diagram of an example CI record data structure in an initial stage, a CI record 392 contains three fields with data obtained in a first probe or initial probes of a device: MAC address, IP address, and OS version. The fields for the software on the device have not yet been obtained from subsequent probes.

Figure 5B:
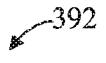
FIG. 5B is a block diagram of a CI record data structure in a subsequent stage during normal operation.

FIG. 5B is a block diagram of the CI record data structure in a subsequent stage during normal operation. A subsequent probe, was able to obtain information about two different Microsoft Windows programs installed on the device and store this information in the CI record 392.

Figure 5C:
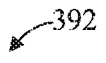
FIG. 5C is a block diagram of a CI record data structure in a subsequent stage during erroneous operation.

FIG. 5C is a block diagram of the CI record data structure in a subsequent stage during erroneous operation. In between the initial probe(s) that obtained networking addresses and OS type and subsequent probe that obtained information about software running on the device, the Windows device was replaced with a Linux device. This resulted in an erroneous CI record having a first part for one device, and a second part for another device. Although the example provided is somewhat glaring (e.g., specific Linux software should not be found on a Windows device), in other situations, the problem may not be so apparent. Thus, it is possible that the network or binary address of a device may be changed between probes, and thus existing data in the CI record may no longer be relevant for the new device. The CI record 392 should not be compromised by containing data from two different devices.

Figure 6:
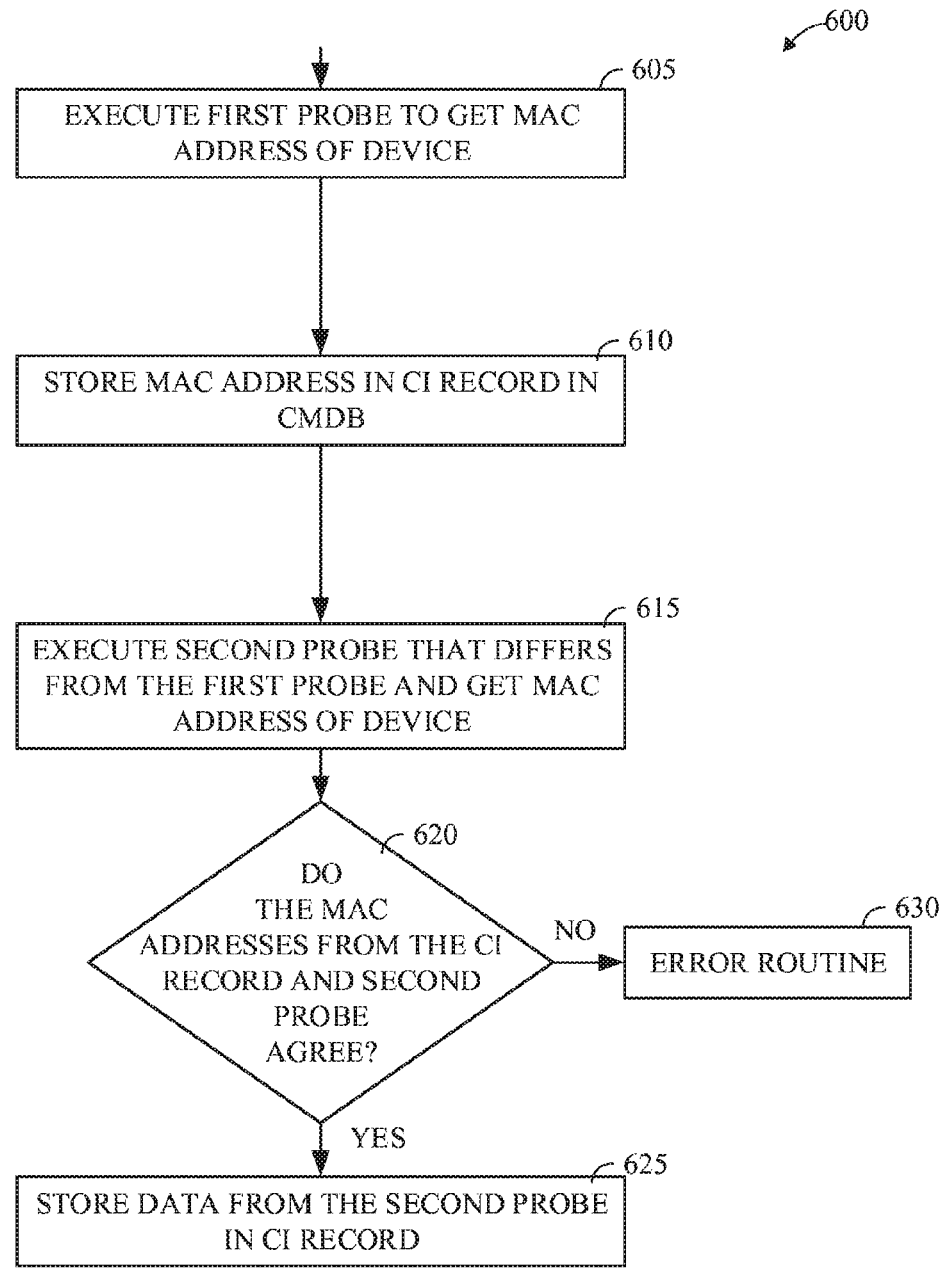
FIG. 6 is a flowchart of the basic operation of the system.

In general, the problem can be solved as illustrated in FIG. 6, which is a flowchart of an implementation of operation 600 of the system. In operation 605, the first probe may be executed to obtain a constant attribute, such as the MAC address, associated with the device. In operation 610, the MAC address may be stored in the CI record in the CMDB. It is also possible, according to an implementation, that the MAC address is provided by a preconfigured CI record (i.e., prior to a probe), and thus, the MAC address need not be stored in the CI record from the first probe. In operation 615, a second probe that differs from the first probe may be executed, and the MAC address associated with the second probe may be obtained. If the MAC addresses from the CI record and the second probe do not agree (operation 620: NO), then the device has been changed out and an error routine (operation 630) can be executed (e.g., error notification/log, flag CI record, etc.). Otherwise, in operation 625, the data from the second probe can be stored in the CI record.

Thus, the probes/queries may contain a request for the MAC address (or other constant attribute data) so that the respective probe responses, regardless of probe type, contain the MAC address (or other constant attribute data) in addition to other requested variables. The retrieved MAC address is compared against a MAC address stored in the CI. Or, in an implementation, the MAC address identified in an initial probe may be included in the subsequent probes so that the probe may be able to take on the comparison itself without a need to access data stores within the instance 360. Since the probes are conducted by sending a series of commands to a receiver on the device, which are executed by the device, the MAC address request (or constant attribute request) can be included with other commands.

If a difference in MAC addresses is detected, some form of action is taken (e.g., notification of error, registration of an error, flagging the CI record, etc.). A new CI 392 for that device may be created in a subsequent probe of the device. In this way, an error situation of having information from multiple devices in a single CI record 392 can be prevented.

All or a portion of aspects of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The embodiments herein may be described in terms of functional block components and various processing operations. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described embodiments have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A multi-stage network discovery system, comprising:
   a processor;
   a network interface configured to connect to a target device, the target device identified by a logical address and associated with a configuration item (CI) record comprising data associated with the target device; a memory;
   a configuration management database (CMDB) that stores the CI record;
   a sensor comprising instructions that are stored in the memory and are executable on the processor to:
   receive first probe data from a first probe of the target device, the first probe data comprising constant attribute data of a constant attribute of the target device;
   store at least part of the first probe data in the CI record;
   receive subsequent probe data from at least one subsequent probe of the target device using the logical address, the subsequent probe data comprising the constant attribute data of the target device;
determine that the constant attribute data from the subsequent probe matches the constant attribute data from the CI record; and
in response to the determination of a match, store the subsequent probe data obtained from the subsequent probe in the CI record; and wherein the sensor comprises:
a filter that receives the first probe data and the subsequent probe data, to remove any extraneous data from the first probe data and from the subsequent probe data, and to deliver filtered first probe data and filtered subsequent probe data;
a parser that receives the filtered first probe data and the filtered subsequent probe data from the filter and to provide structured first probe data and structured subsequent probe data having respective key values that correspond to data in the CI record stored in the CMDB;
a mapper that maps the structured first probe data and the structured subsequent probe data to corresponding structures in the CI record stored in the CMDB;
a normalizer that converts the mapped first probe data and the mapped subsequent probe data into a standardized format; and
a reconciler that determines whether the standardized first probe data and the standardized subsequent probe data is suitable to be stored in the CI record of the CMDB.

2. The multi-stage network discovery system, as set forth in claim 1, wherein the sensor comprises an updater that stores the reconciled first probe data in the first part of the CI record of the CMDB and to store the reconciled subsequent probe data in second part of the CI record of the CMDB.

3. A multi-stage network discovery system, comprising:
a processor;
a network interface configured to connect to a target device, the target device identified by a logical address and associated with a configuration item (CI) record comprising data associated with the target device;
a memory;
a configuration management database (CMDB) that stores the CI record;
a sensor comprising instructions that are stored in the memory and are executable on the processor to:
  receive first probe data from a first probe of the target device, the first probe data comprising constant attribute data of a constant attribute of the target device;
  store at least part of the first probe data in the CI record;
  receive subsequent probe data from at least one subsequent probe of the target device using the logical address, the subsequent probe data comprising the constant attribute data of the target device;
  determine that the constant attribute data from the subsequent probe matches the constant attribute data from the CI record; and
  in response to the determination of a match, store the subsequent probe data obtained from the subsequent probe in the CI record;
  determine that the constant attribute data from the subsequent probe does not match the constant attribute data from the CI record; and
  in response to the determination of no match, not store the subsequent probe data obtained from the subsequent probe in the CI record.

4. The multi-stage network discovery system, as set forth in claim 3, wherein the sensor comprises instructions that are stored in the memory and are executable on the processor to:
  in response to the determination of no match, providing an error indication.

5. A multi-stage network discovery system, comprising:
a processor;
a network interface configured to connect to a target device, the target device identified by a logical address and associated with a configuration item (CI) record comprising data associated with the target device;
a memory;
a configuration management database (CMDB) that stores the CI record;
a sensor comprising instructions that are stored in the memory and are executable on the processor to:
  receive first probe data from a first probe of the target device, the first probe data comprising constant attribute data of a constant attribute of the target device, wherein the constant attribute of the target device comprises a MAC address of the target device;
  store at least part of the first probe data in the CI record;
  receive subsequent probe data from at least one subsequent probe of the target device using the logical address, the subsequent probe data comprising the constant attribute data of the target device;
  determine that the constant attribute data from the subsequent probe matches the constant attribute data from the CI record; and
  in response to the determination, store the subsequent probe data obtained from the subsequent probe in the CI record.

6. A multi-stage network discovery system, comprising:
a processor;
a network interface configured to connect to a target device, the target device identified by a logical address and associated with a configuration item (CI) record comprising data associated with the target device;
a memory;
a configuration management database (CMDB) that stores the CI record;
a sensor comprising instructions that are stored in the memory and are executable on the processor to:
  receive first probe data from a first probe of the target device, the first probe data comprising constant attribute data of a constant attribute of the target device, wherein the constant attribute of the target device is an attribute of the target device that is not expected to change;
  store at least part of the first probe data in the CI record;
  receive subsequent probe data from at least one subsequent probe of the target device using the logical address, the subsequent probe data comprising the constant attribute data of the target device;
  determine that the constant attribute data from the subsequent probe matches the constant attribute data from the CI record; and
  in response to the determination, store the subsequent probe data obtained from the subsequent probe in the CI record.

7. A method for multi-stage network discovery, comprising:
receiving first probe data from a first probe of a target device, the first probe data comprising constant attribute data of a constant attribute of the target device;

storing at least part of the first probe data in a configuration item (CI) record stored in a configuration management database (CMDB);

receiving subsequent probe data from at least one subsequent probe of the target device using a logical address of the target device, the subsequent probe data comprising the constant attribute data of the target device;

determining that the constant attribute data from the subsequent probe matches the constant attribute data from the CI record; and in response to the determination of a match, storing the subsequent probe data obtained from the subsequent probe in the CI records removing any extraneous data from the first probe data and from the subsequent probe data, and delivering filtered first probe data and filtered subsequent probe data;

receiving the filtered first probe data and the filtered subsequent probe data and providing structured first probe data and structured subsequent probe data having respective key values that correspond to data in the CI record stored in the CMDB;

mapping the structured first probe data and the structured subsequent probe data to corresponding structures in the CI record stored in the CMDB:

converting the mapped first probe data and the mapped subsequent probe data into a standardized format: and determining whether the standardized first probe data and the standardized subsequent probe data is suitable to be stored in the CI record of the CMDB.

8. The method, as set forth in claim 7, comprising storing the reconciled first probe data in the first part of the CI record of the CMDB and storing the reconciled subsequent probe data in second part of the CI record of the CMDB.

9. A method for multi-stage network discovery, comprising:

receiving first probe data from a first probe of a target device, the first probe data comprising constant attribute data of a constant attribute of the target device, wherein the constant attribute of the target device comprises a MAC address of the target device;

storing at least part of the first probe data in a configuration item (CI) record stored in a configuration management database (CMDB);

receiving subsequent probe data from at least one subsequent probe of the target device using a logical address of the target device, the subsequent probe data comprising the constant attribute data of the target device;

determining that the constant attribute data from the subsequent probe matches the constant attribute data from the CI record; and in response to the determination, storing the subsequent probe data obtained from the subsequent probe in the CI record.

10. A method for multi-stage network discovery, comprising:

receiving first probe data from a first probe of a target device, the first probe data comprising constant attribute data of a constant attribute of the target device, wherein the constant attribute of the target device is an attribute of the target device that is not expected to change;

storing at least part of the first probe data in a configuration item (CI) record stored in a configuration management database (CMDB);

receiving subsequent probe data from at least one subsequent probe of the target device using a logical address of the target device, the subsequent probe data comprising the constant attribute data of the target device;

determining that the constant attribute data from the subsequent probe matches the constant attribute data from the CI record; and in response to the determination, storing the subsequent probe data obtained from the subsequent probe in the CI record.

* * * * *